United States Patent [19]

McCutchen

[11] Patent Number: 5,040,081
[45] Date of Patent: Aug. 13, 1991

[54] AUDIOVISUAL SYNCHRONIZATION SIGNAL GENERATOR USING AUDIO SIGNATURE COMPARISON

[76] Inventor: David McCutchen, 931 N. Gardner St., West Hollywood, Calif. 90046

[21] Appl. No.: 312,292

[22] Filed: Feb. 16, 1989

Related U.S. Application Data

[63] Continuation of Ser. No. 911,126, Sep. 23, 1986, abandoned.

[51] Int. Cl.5 ................... H04N 5/782; G11B 27/10
[52] U.S. Cl. ........................................... 360/14.3
[58] Field of Search ................... 360/13, 14.1, 14.2, 360/14.3, 15, 72.2, 73, 74.4; 381/43, 45, 48, 49; 369/58

[56] References Cited

U.S. PATENT DOCUMENTS

| | | | |
|---|---|---|---|
| 3,441,342 | 4/1969 | Ball et al. | 360/73 X |
| 3,789,159 | 1/1974 | Feit et al. | 360/13 |
| 3,911,488 | 10/1975 | Wood et al. | 360/14.3 X |
| 4,067,049 | 1/1978 | Kelly et al. | 360/13 X |
| 4,223,180 | 9/1980 | Eckels | 381/49 |
| 4,375,655 | 3/1983 | Korth et al. | 360/15 |
| 4,477,845 | 10/1984 | Mortlock et al. | 360/26 |
| 4,490,811 | 12/1984 | Yianilos et al. | 364/900 |
| 4,490,840 | 12/1984 | Jones | 381/48 |
| 4,591,928 | 5/1986 | Bloom et al. | 360/13 |
| 4,598,324 | 7/1986 | Efrom et al. | 369/58 X |
| 4,636,879 | 1/1987 | Norita et al. | 360/15 X |
| 4,720,864 | 1/1988 | Tajima et al. | 381/43 |
| 4,758,908 | 7/1988 | James | 360/13 X |

OTHER PUBLICATIONS

Speech Analysis Synthesis and Preception; Flanagan, ©1965, Alleclinic Press Inc. Publishers; N.Y., pp. 60, 139.
"Speech Recognition Experiments with Linear Predication, Bandpass filtering, and dynamic programming"; IEEE Transactions on Acoustics, Speech & Signal Processing wl. Assp-24, No. 2, pp 183-188; Apr. 1976; White et al.
Speech Analysis Synthesis and Preception: Flanagan ©1965 Academic Press, Inc.; N.Y. pp. 53, 60; 139.
Simplified Block Diagram of Invention.
Complete Block Diagram of Invention Related to FIGS. 1A + 1B.
Brochure of the Commercial Embodiment of the Present Invention—The "Soundtracker".

(List continued on next page.)

*Primary Examiner*—Donald McElheny, Jr.
*Attorney, Agent, or Firm*—Hecker & Harriman

[57] ABSTRACT

A method and apparatus for synchronizing a plurality of signals to a desired signal. The present invention provides real time synchronization of similar audio and any associated sequence of images, either on video or on film, without the need for a separate reference or carrier frequency to be added to both signals. A slave input is synchronized to a master input signal. The slave and master signals are filtered and selected frequencies are analyzed. The resulting output provides signature information about the signals. Thus signature information is digitized into a relatively low number of bits so that comparison of the master and slave signals can be done in real time. In the preferred embodiment of the present invention, three methods of analysis are used on the inputted signals, a bandpass method, a mathematical method and an envelope method. The outputs of the three methods of analysis are inputted to a cross correlation processor which compares the respective analysis outputs for the master and slave inputs. A host computer is utilized for controlling the analysis process, displaying the spectral frame and timing data, and for communicating with the cross-correlator board to determine the amount of speed variation to be done. The computer then outputs a speed control signal, usually to a variable SMPTE generator, which drives a transport control synchronizer to change the speed of the player of the slave signal to keep it in synchronization with the master signal.

26 Claims, 5 Drawing Sheets

OTHER PUBLICATIONS

Brochure on Wavetek 660B Dual Channel Spectrum Analyzer.
Brochure on Sony DAE-3000 Digital Audio Editor (Current Version of the DAE-1100).
Lexicon Brochure on 1200C Time Compressor, c. 1986.
Lexicon Brochure on 2400 Stereo Audio Time Compressor/Expander, c. 1986.
Eventide Brochure on Model H949 Harmonizer Audio Pitch Shifter Special Effects Device, c. 1980.
"Tape Editing System"; Persch., IBM Technical Disclosure Bulletin, vol. 5, No. 11; Apr. 1913.
"Electronic Editing of Digital Audio Programs"; Loungquist et al., Conference-Int'l Conference on Video & Data Recording Southhampton Eng. (Jul. 24–29, 1979).
"Audio Sectioner"; Fourniev; Elektor (Jul./Aug. 1979), vol. 51/52; No. 7–8, pg. 8-01-8-03.
"Speech Recognition Experiments with Linear Predication Bandpass Filtering and Dynamic Programming"; White et al.; IEEE Transactions on Acoustics, ASSP-24; No. 2, pp. 183–188, Apr. 1976.
"Speech Recognition Using Autocorrelation Analysis"; Parton; IEEE Transactions of Audio and Electroacoustics; vol. AU-16, No. 2, Jun. 1968 pp. 235–239.

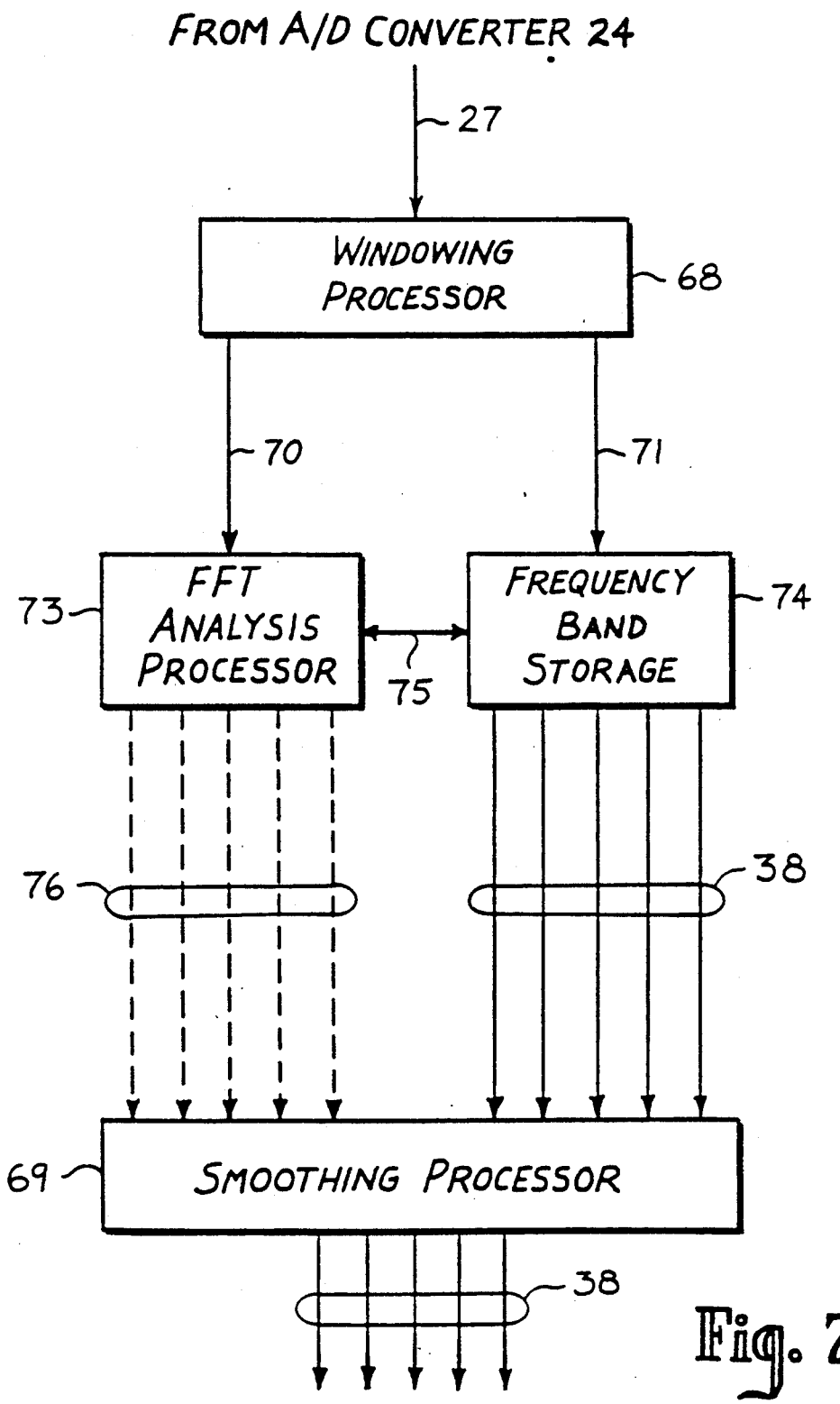

AUDIOVISUAL SYNCHRONIZATION SIGNAL GENERATOR USING AUDIO SIGNATURE COMPARISON

This is a continuation of application Ser. No. 911,126 filed Sept. 23, 1986, now abandoned.

1. Field of the Invention

This invention relates to the field of synchronization devices for one or more signal sources and specifically to the synchronizing of sound tracks with video tracks or other audio/visual signals.

2. Background Art

In audio/visual production, it is often desired to synchronize one or more sources of audio or video signals. Editing especially involves many separate sound and picture tracks, which must be kept in precise synchronization with each other. Because the speed of different playback motors can vary significantly, there is the danger of the different tracks drifting out of synchronization with each other over time. Film tracks can be kept physically aligned to each other with mechanically linked gears whose teeth fit into regular perforations on the film itself, but electronic media, such as video or audio tape recordings, must be kept in synchronization by electronic means. In the prior art, this has meant adding extra reference signals to the tracks to act as "electronic sprocket holes," reference signals which are regular, periodic and easily detectable. One track is designated as the master, and one or more as the slaves. The reference signals from the master and slave are compared, and phase differences in the signals are used to generate an error signal to speed up or slow down the drive motor of the slave track player to synchronize the reference signal, and thereby the slave track itself, to the master track.

One such prior art synchronization system is found in Ball, U.S. Pat. No. 3,441,342. The device of Ball utilizes a reference signal whose frequency and phase characteristics correspond to the desired frequency and phase or speed and position characteristics of a recording and reproducing system to be controlled. The master reference signal and the reference signal from the device to be controlled are converted into pulse trains by a transducer, and coupled to a pulse resolver and a differential sensing circuit, which then sends out an analog signal to control the voltage of the motor of a recording unit.

In Feit, U.S. Pat. No. 3,789,159, a device for synchronizing the recording of a plurality of aural sounds in a predetermined time relationship is disclosed. In Feit, the speed of several slave tape players are adjusted in order to synchronize them with a timing track coming from a master tape player. The slave tape players of Feit each have one track for sound and another track for a synchronizing signal which is detected and used to synchronize the slave machines with the master machine.

Mortlock, U.S. Pat. No. 4,477,845, discloses a dynamic skew correction for multi-signal analog recording. Mortlock provides circuitry for extracting and comparing a carrier frequency signal placed on a recording track with the carrier frequency signal from a master track, and adjusting the speed of a slave track to provide synchronization.

Recently more and more electronic media have adapted SMPTE (Society of Motion Picutre and Television Engineers) Time Code, as outlined in American National Standard ANSI V98.12M-1981 and revised recently in ANSI/SMPTE 12M-1986, as a standard reference signal to use for synchronizing various devices to a master, which is assumed to run at a constant rate of speed.

One disadvantage associated with prior art synchronization devices is the requirement of a reference signal to be recorded onto the slave track, and usually the master as well. This reference signal must typically be applied during the recording process itself. Regardless of when its addition to the track takes place, it requires a separate channel to carry the reference signal, as well as additional circuitry to detect the signal.

Another problem associated with prior art synchronization devices is the inability to detect and compensate for dynamic timing changes in the relationship between the master and slave sound tracks themselves. Because the reference signals used in prior art are periodic and regular, they bear no real relationship to the actual sound signal they accompany, which may vary in tempo. Typically, prior art synchronization means can only compensate for variations in the speed and position of various recording devices transporting otherwise identical sound tracks, and are unable to work adequately in situations requiring synchronization to an independently generated signal source. For example, in the motion picture and television industry, dialogue is often "dubbed in" to a previously filmed scene in a separate operation known as dialogue replacement. This process requires that the new live dialogue being added to the prerecorded film precisely match the lip movements of the filmed actor. If the timing of the replacement dialogue fails to match the original dialogue, there is at present no automatic mechanical means to speed up and slow down the new signal to make it match the old.

Dynamic synchronization is also needed when programs are dubbed into a second language, to avoid instances of spoken words when the actor's mouth is closed, or a lack of words when the mouth is moving. Another application where synchronization to a variable signal source is required is the varying of a prerecorded picture to match a new soundtrack, as is required sometimes when making video copies of films or commercials.

Further, prior art devices are unable to provide real time synchronization to independent signal sources. For example, there is no apparatus in the prior art for synchronizing a prerecorded film or video to a live performance to make the sounds and actions on the film or video match the sound and actions of the performer. Such synchronization must take place in real time, as the performance is in progress.

Therefore, it is an object of the present invention to provide a method and apparatus for providing synchronization of similar but independent signal sources without requiring the recording or addition of a carrier or reference signal to the signal sources.

It is another object of the present invention to provide a method and apparatus for synchronizing similar but independent signal sources in real time.

It is yet another object of the present invention to provide a method and apparatus for synchronizing similar but independent signal sources which vary in non-periodic fashion.

SUMMARY OF THE PRESENT INVENTION

A method and apparatus for synchronizing a plurality of signals to a desired signal. The present invention provides real time synchronization of audio signals and any associated synchronized sequence of images, either on video or on film, without the need for identical reference or carrier frequency signals to be added to both original signals. A slave sound input from an audio/visual player whose speed can be varied is used for synchronization to a master sound input signal. Both the master and slave sounds include some measurable similarities to serve as a basis for comparison. The slave and master sound signals are filtered to emphasize their common features and frequencies. The resulting output is then analyzed to extract signature information about the signals. This signature information is digitized into a relatively low number of bits so that comparison of the master and slave signals can be done in real time, by comparing the simplified signature information instead of the complex original signals. In the preferred embodiment of the present invention, three simultaneous methods of analysis are used to extract signature information from the inputted signals, described here as a bandpass method, a mathematical method and an envelope method.

The bandpass method utilizes bandpass filters set to a desired range of frequencies so that signature information can be extracted from the inputted signals. In the preferred embodiment, eight frequency bands are extracted from the master and slave signals, and the amplitude information from these is then digitized.

In the mathematical method, the signals are first digitized and a Fast Fourier Transform analysis is performed on the signal information. The Fourier Transforms are designed so that the output is eight frequency bands, matching the same frequencies and format as the output of the bandpass filters.

In the envelope method, overall readings of the inputted signals are recorded for analysis. In the present invention, the average amplitude of the frequency bands provides the envelope information.

Each of these three methods of analysis provides a different perspective on the original source signal. Any one of them may provide adequate signature information for the synchronization process, but the use of all three enables cross-checks and comparisons to be done to ensure accuracy. Special uses may also be made of these multiple methods of analysis. If the frequency outputs are made compatible, and a bandpass method is assigned to one signal, and the mathematical to another, then two signals can be analyzed and compared at once. Use of envelope measurements as reference also permits the storage and accurate playback of master signals lacking control tracks.

The outputs of the three methods of analysis are assembled as spectral frames, which represent "snapshots" of the signal at a given moment in time. These spectral frames also contain timing information, usually derived from whatever pulse or synchronization track accompanies the signal being loaded. If none is present, then a timing code is added for internal use within the invention. The spectral frames then go to the cross-correlation processor, which compares the respective analysis outputs for the master and slave signals and determines the offset, if any, between them. If the offsets produced by at least two of the three methods of analysis match, synchronization recommendations are then made based on that information. An external host computer is utilized for controlling the analysis and comparison process, and for evaluating the results of the cross-correlation processor. The rate of a special variable-rate SMPTE Time Code generator, which controls a standard SMPTE-driven transport control synchronizer, is varied to speed up or slow down the slave player as needed to produce synchronization between the master signal and the slave sound and any associated picture.

BRIEF DESCRIPTION OF THE DRAWINGS

FIG. 7 is a block diagram illustrating the transform analysis circuitry of FIG. 1a and 1b.

DETAILED DESCRIPTION OF THE PRESENT INVENTION

A method and apparatus for synchronizing two or more signals is described. In the following description, numerous specific details are set forth, such as frequency bands, sample rate, number of bits, etc. in order to more thoroughly describe the present invention. However, it will be obvious, to one skilled in the art, that the present invention may be practiced without these specific details. In other instances, well known features have not been described in detail in order not to unnecessarily obscure the present invention.

The preferred embodiment of the present invention will be described in terms of synchronizing audio signals. However, the present invention is not limited to audio signals but may be utilized for synchronizing any signals with measurable similarities from which signature information can be obtained. In addition, the present invention is described with respect to the comparison of a single master signal with a single slave signal. However, the present invention may be easily adapted to compare a plurality of slave signals to a master signal.

Figure 1A:
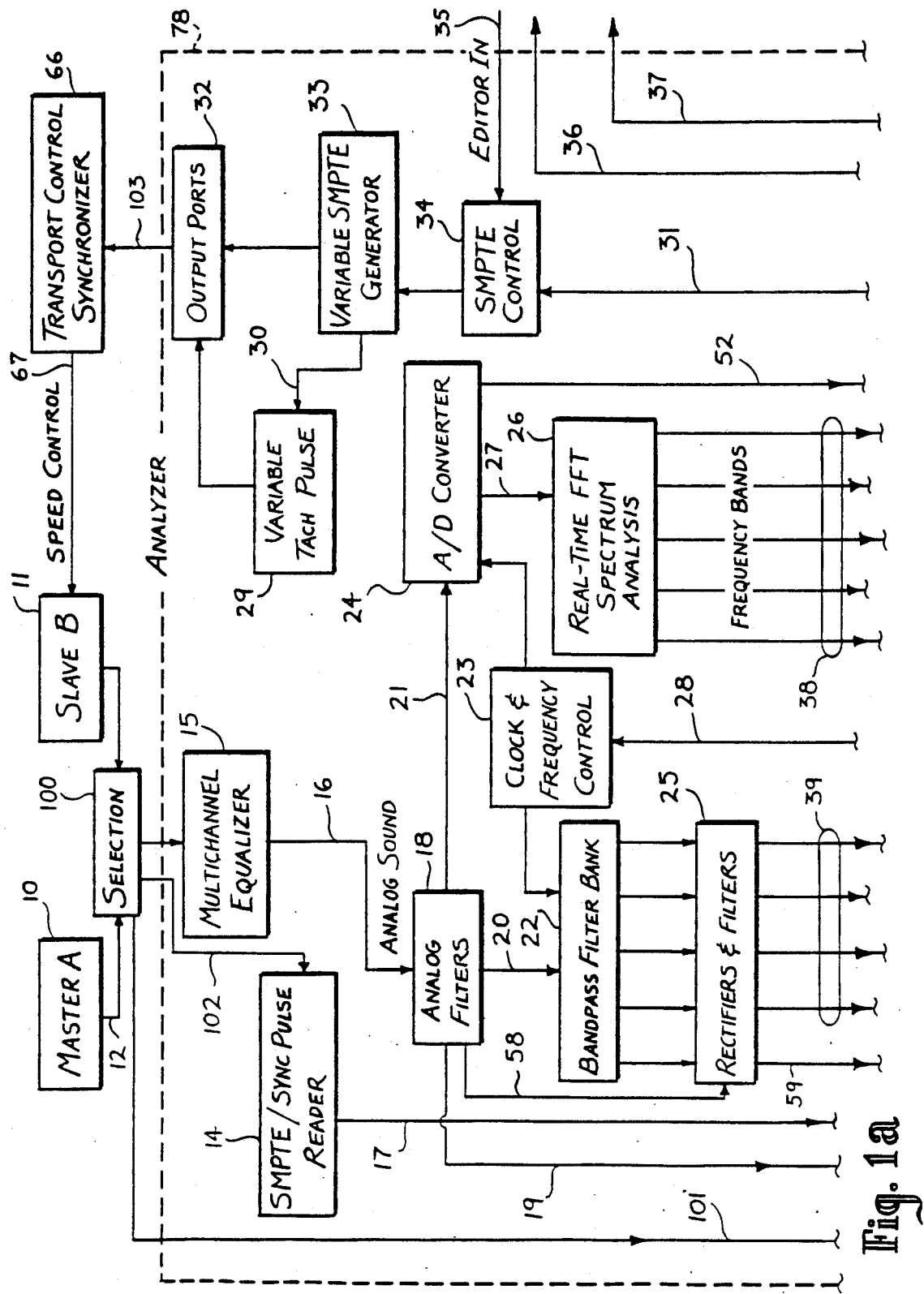
FIGS. 1A and 1B are block diagrams illustrating the preferred embodiment of the present invention.
Figure 1B:
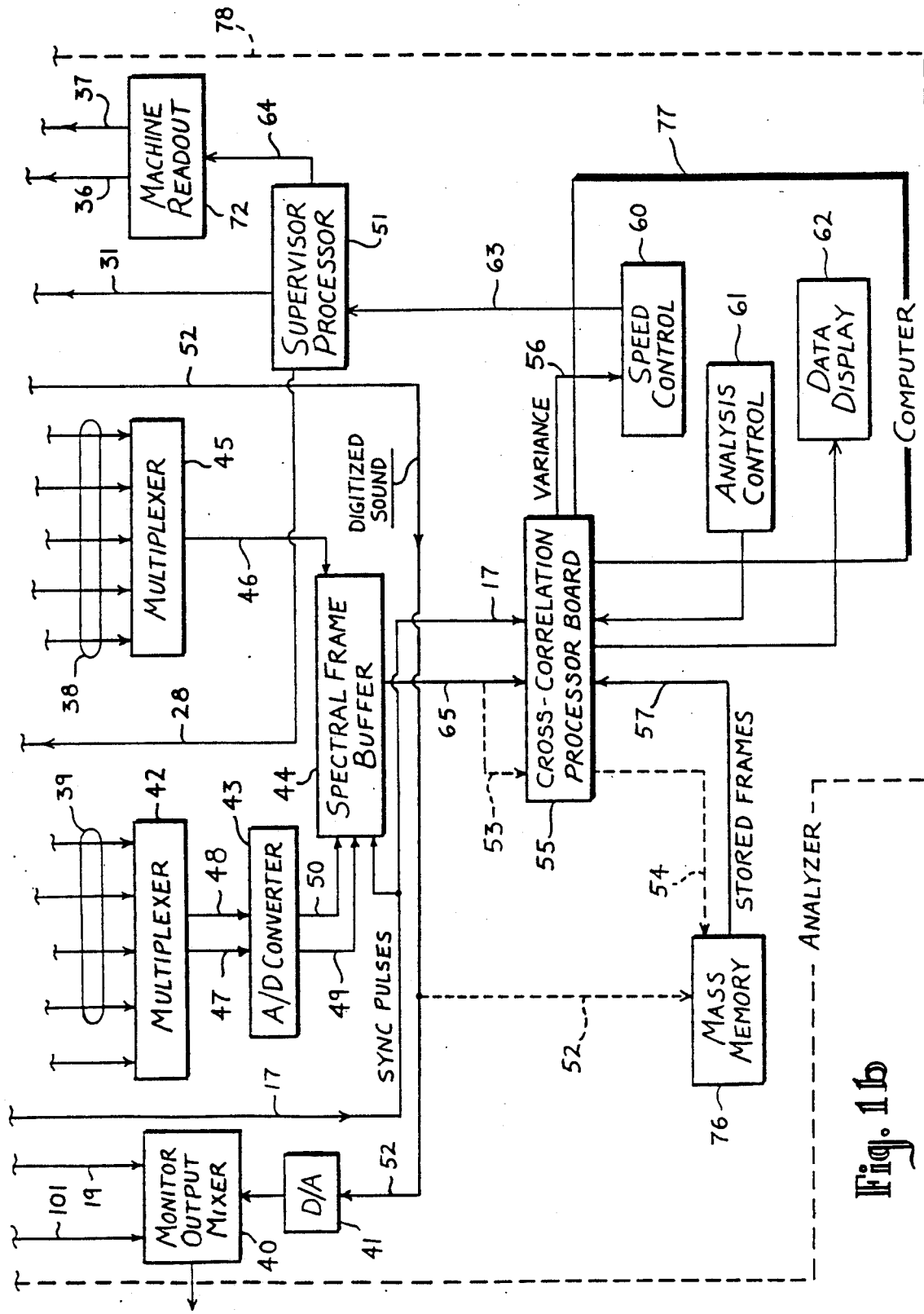

FIGS. 1A and 1B illustrate a block diagram of the preferred embodiment of the present invention. Signal sources master A 10 or slave B 11 output signals 12 and 13 respectively. By way of example, signals 12 and 13 represent audio signals. Associated images synchronized to slave signal 13 are not shown. In order to simplify the operation of the present invention, audio signals 12 and 13 are in mono. If the original soundtracks are in stereo, they are first converted to mono prior to the operation by the present invention. The present invention may be utilized with stereo signals, but for the sake of simplicity in the present example, mono signals will be discussed.

In the preferred embodiment of the present invention, only one sound signal is analyzed at a time, to avoid having to duplicate the analysis circuitry described below. Typically, one sound is analyzed and stored into memory, then called up and compared to another signal coming through the system live. However, simultaneous comparison and analysis of signal sources may be achieved with the present invention. Both signals can be loaded and compared at once in the present embodiment if the analysis outputs from bandpass analysis and the mathematical analysis are balanced and matched in format, and the slave is assigned to one method and master to another method. Then the results produced by different methods of analysis would be sufficiently similar to allow for a meaningful comparison.

Usually the slave track is loaded first and compared with the live master, which does not need to have a control pulse track. The data from the stored slave track is called up from memory according to the pulse track information accompanying the signal, by matching that from the live input to that from memory. This information will almost always accompany the slave track because the slave signal would come from a machine whose speed could be externally varied, and such machines always use some accessible form of control or timing pulse. The location of the present moment can also be deduced from the amount of speed correction being done on a particular transport. If an unregulated master track with no timing code s loaded first, however, envelope information is extracted from it at the time of loading, and at the time of playback as well, and monitored to make sure that the stored signal being called up for comparison with the slave matches the live signal coming in. This extra step of extraction and comparison will not be described in detail in the present embodiment of the invention.

The sound signal selected to be loaded into the system, either 12 or 13, is inputted first to multichannel equalizer 15. The other signal goes directly to the monitor output mixer 40.

Equalizer 15 is an analog equalizer which balances the characteristics of the two signals, emphasizing similar frequencies which can be used to provide a meaningful comparison between them. The output of equalizer 15 is an analog signal coupled on line 16 to analog filter 18. Filter 18 filters out noise from the sound signal, further clarifying and simplifying the information contained in the signal. The selected signal is then subjected to the three methods of analysis of the present invention.

Many soundtracks or other signal sources include a SMPTE Time Code signal or other synchronization pulse which accompanies the signal to provide time measurement, speed measurement or merely to identify start and stop points on the track. A SMPTE/sync pulse reader 14 is coupled to on line 102 through the selection 100 a selected signal to extract this timing information from either the master or the slave source.

BANDPASS ANALYSIS

The output of analog filters 18 is coupled through line 20 to a bandpass filter bank 22. This bandpass filter bank contains a plurality of switched capacitor-type bandpass filters set to filter out all frequencies other than those of interest. As mentioned previously, certain frequencies can positively identify the essential characteristics of the sound signal without the need for extraneous information. By eliminating this extraneous information the present invention can operate at real-time speeds.

In the preferred embodiment of the present invention, for sound analysis, the bandpass filter bank is set for eight frequencies in a range between 30 HZ and 3.84 KHZ. For simplicity the frequency divisions are taken at even exponential divisions between the ranges of frequency. In other words, octave division is utilized in the preferred embodiment of the present invention. However, any three or more frequencies which can be used to identify the signature of the sound may be utilized.

Also inputted to the bandpass filter bank 22 is a clock and frequency control signal from clocking circuit 23. If the speed of a live slave sound source 11 is adjusted to compensate for differences in synchronization between it and a stored master sound source 10, the frequencies of the slave signal 13 will be distorted up or down accordingly. Therefore the clock circuit 23 is utilized to dynamically adjust the center frequencies of the divisions of the bandpass filter bank 22, so pitch distortion caused by speeding up and slowing down of the slave signal will not affect the frequency readings of the filter bank 22.

The output of the filter bank 22 is coupled to a plurality of rectifiers and filters 25. These turn the bipolar, fluctuating outputs of the individual bandpass filters into positive, solid number values. The output 39 of rectifier and filter bank 25 is coupled to multiplexer 42 (FIG. 1B). The multiplexer collects the readings of the filter bank from top to bottom 300 times per second in the preferred embodiment of the present invention. The multiplexer 42 outputs this information on output 48 to an eight-bit analog-to-digital (A/D) converter 43. This A/D converter converts the analog information into a series of digital records of the frequency characteristics of the signal at that moment of time. These digital records are coupled through output 50 to the Spectral Frame Buffer 44, where they are stored along with the results of the other two types of analysis also being done simultaneously to the source signal.

A spectral frame is a predefined amount of time, similar to a film frame, containing a "snapshot" of all the signature information known about the sound at that moment. At the rate of 300 spectral frame per second, there are 10 spectral frames per video frame at the rate of 30 frames per second, or 12.5 per film frame at the rate of 24 fps. The time of a spectral frame provides a horizontal axis, the frequency information provides a vertical axis, and amplitude information provides a Z axis; thus a spectral frame is a three-dimensional unit containing information about the essential characteristics of the sound.

ENVELOPE INFORMATION

The envelope analysis is a coarse analysis which reads overall changes in the amplitude of the inputted signals. The envelope information is not concerned with frequency analysis, but rather with basic changes in the inputted information. The output 58 of analog filter 18 is coupled to rectifier and filter bank 25 where the envelope information 59 is extracted with high pass filters.

This envelope information 18B is also collected by multiplexer 42 and outputted on line 47 to A/D converter 43. The A/D converter 43 digitizes the envelope information and couples it through line 49 to spectral frame buffer 44. Records of envelope information are assembled at the same spectral frame rate as the records of the rest of the bandpass filter bank.

MATHEMATICAL ANALYSIS

Referring again to FIG. 1A, the output of analog filter 18 is coupled through line 21 to A/D converter 24. The A/D converter 24 converts the analog signal to a series of eight-bit digital words at the basic rate of 10,000 bytes/second. Clock circuit 23 outputs a clocking signal to the A/D converter 24 so that pitch distortions due to speed variations of the slave source 11 can be corrected by changing the sampling frequency.

The A/D converter 24 creates a digital sound signal on line 54 for monitoring and for storage and playback, and also on line 27 to spectrum analysis circuitry 26. Spectrum analysis circuitry 26 is illustrated in detail in FIG. 7.

In the preferred embodiment of the present invention, this circuitry is implemented in a TMS-320 digital signal processor manufactured by Texas Instruments as described in Burrus and Parks, *DFT/FFT and Convolution Algorithms* (Wiley 1985).

This signal analysis uses a standard mathematical analysis of the signal known as the Fourier Transform, first described in the eighteenth century, but recently refined by Cooley and Tukey into the Fast Fourier Transform. This mathematical procedure extracts the basic frequencies of a given set of data samples according to the principle of least squares. The given set of samples is assumed to be the periods in a regular waveform, and the function looks for subfrequencies within this larger frequency. For this reason, the data must be divided into regular computational divisions called windows prior to analysis. The number of sample points in a window determines the number of frequencies which can be extracted from the computation, which is usually equal to one half the number of sample points. To minimize inaccuracies in frequency response known as leakage which can occur because of reverberations set up by these arbitrary divisions in the data stream, the data must be shaped when it is formed into a window. The preferred shaping formula for the present application is known as the Hamming window, shaped according to the formula $HM(X) = 0.54 - 0.46 \, (\cos(2 \, PI \, X))$ $0 \leq x \leq 1$.

The Fast Fourier Transform, as described by R. W. Hamming in *Digital Filters*, involves streamlining the computations necessary to extract the Fourier coefficients. If X is the original data, and 2N equals the number of sample points in a window, factored into two integers $PQ = 2N$, the sample points are thus $X = m/PQ$. The Fourier expansions coefficients of the expansion of the function $G(x)$ are:

$$A_k = A(k) = \frac{1}{PQ} \sum_{m=0}^{PQ-1} G(X_m) \, e^{-2\pi i k X_m}$$

If $k = k_0 + k_1 P$ and $m = m_0 + m_1 Q$ then, $$A(k_0 = k_1 P) = \frac{1}{PQ} \sum_{m_0=0}^{Q-1} e^{-2\pi i k_0 m_0/PQ} \, e^{-2\pi i k_1 m_0/Q}$$

$$\left[ \sum_{m_1=0}^{P-1} G\left(\frac{m_0}{PQ} + \frac{m_1}{P}\right) e^{-2\pi i k_0 m_1/P} \right]$$

with the part in brackets as a Fourier expansion of $1/Q$ samples of the function, phase shifted $m_0/PQ$. If these are labeled as $\overline{A}(k_0, m_0)$ then $A(k_0 + k_1 P) = \frac{1}{PQ} \sum_{m[0]=0}^{Q-1} \overline{A}(k_0, m_0) \, e^{-2\pi i[(k0/PQ)+(k1/Q)]m0}$ Referring to FIG. 7, spectrum analysis circuitry includes a windowing processor 68 whose input is the output 27 of A/D converter 24. The windowing processor 68 shapes the data into Hamming windows. In the present invention, only 16 bytes at a time are used for each analysis window, which defines a result of eight one-octave frequencies. As known previously, any three or more frequencies may be defined, depending on the number of bytes used in the FFT analysis. FFT analysis, however, is a time intensive process. In the preferred embodiment of the present invention, a relatively small number of bytes is used to enable the analysis to be done at real time speeds, and to match the resulting frequency outputs to the range and timings of the bandpass analysis.

The output of window processor 68 is coupled through lines 70 and 71 to the FFT analysis processor. This processor has two sections 73 and 74; while one is engaged in the FFT analysis itself, the other is outputting the results of its previous analysis as shown on line 75, and loading in the data for its next one on line 71. The outputs 75 or 76 of the frequency band analysis go to the smoothing processor 69 which is coupled to multiplexer 45 (FIG. 1B).

Referring again to FIGS. 1A and 1B, the output 38 of FFT spectrum analysis circuit 26 is coupled to multiplexer 45, where it is collected and outputted on line 46 to spectral frame buffer 44. Spectral frame buffer 44 assembles the spectral frames from the three types of analysis, FFT, bandpass and envelope, along with timing information and outputs the completed composite spectral frame for use by the comparison circuitry of the present invention.

SIGNAL CORRELATION AND SYNCHRONIZATION

Referring to FIGS. 1A and 1B, the output of spectral frame buffer 44 is coupled through a parallel port on line 65 to the cross correlation processor board 55, which is a card on the bus of the external host computer. In the preferred embodiment of the present invention, the correlation board uses another Texas Instruments TMS - 320 digital signal processor. However, any suitable processor may be utilized.

In the preferred embodiment of the present invention, only one of the signal sources need be processed at a time. The spectral frames of one source signal, and any digitized sound which accompanies them for monitoring purposes, are located first into a mass memory device, then these spectral frames are called up as needed by the cross-correlation processor for comparison with the spectral frames from a second signal coming through the system "live." Having one of the signals loaded into memory first enables it to be examined at leisure through the host computer and also enables the future to be brought into the correlation process. Therefore, phantom line 53 represents a prior analysis of one of the sound signals and phantom line 54 represents the spectral frames of this analysis being stored in mass memory 76. In such a situation, output the live output 65 from spectral frame buffer 44 would then be compared with the stored output 57 of mass memory 76. However, if parallel systems of analysis circuitry are used, both signals could be analyzed for comparison at the same time.

The spectral frames from the master and slave are compared in the cross-correlator board 55, which separately and simultaneously compares the result of all three types of analysis of the master and slave signals. In the preferred embodiment of the present invention, ten spectral frames are compared at a time, each containing bandpass and FFT readings of eight frequency bands, as well as envelope information. Within this sample of ten spectral frames, each method of analysis and each frequency band is compared separately. In the comparison process, the frequency band or envelope values are multiplied against each other, in sequential combinations.

For example, ten envelope values from ten frames of the master track, which is coming in live, are compared to their corresponding frames 1-10 of the pre-stored slave track, and −10-0 from the future signal and 11-20 from farther in the past. Master value 1 is multiplied against slave −10 to slave 10. Value 2 is multiplied against slave −9 to 11.

The system looks for peaks which indicate that patterns of like values have been matched against each other. The processor then evaluates the results produced from each of the three methods of analysis to detemine the best fit of the data. In this way, the best match between the sounds will be discovered and the offset, if any, recorded as the difference in speed that must be made to make one match the other.

The present invention then advances the spectral frames by one, and runs the comparison again. If there is serious disagreement in the result from the three types of analysis, but two of the types provide similar results, the majority will be followed by the present invention, and the method having trouble will widen the range of the ten spectral frames it is comparing by selecting them at more spread-out intervals. If agreement is still lacking, the range of spectral frames being considered by one or more of the analysis methods will be extended, in five stages of powers of two.

Below is a chart of the range and accuracy in seconds of the different comparison buffers, as well as the numbers of the frames involved.

put of the cross-correlator board, and outputs a digital control signal 63 on a serial port to the supervisor processor 51 back within the main body of the invention. Besides controlling the dynamic pitch compensation response within the invention through line 28 to clock and frequency control 23, this supervisor processor 51 also controls through line 31 the output of SMPTE control 34 and the variable SMPTE generator 33. (FIG. 1A). Time code numbers from an external edit controller 35 and the time code/pulse reader 14 are used to determine the frame numbers and format used by the time code generator. The variable SMPTE generator 33 in the preferred embodiment generates the more common longitudinal form of time code, but may be used to generate the vertical interval type as well. SMPTE logitudinal time code consists of a coded series of 80 bits, usually sent out at a precise rate, thereby defining both the number of the SMPTE frame and a precise frame rate at the normal speeds of 24, 25, 29.97 or 30 frames per second. The present invention, however, uses a variable SMPTE generator, which can be controlled to generate these bits at a changing rate, thereby producing the same frame numbers as before, but at a different rate of speed. This rate can even by changed within a frame, to allow smooth and accurate transistion between different rates of speed, and more accurate synchronization capabilities. In other words, unlike prior art synchronization devices, which synchronize signals based on reference signal running at fixed rates of speed, the present invention can continuously adjust the speed of the control code going to a slave machine so that accurate synchronization results.

| NAME | TIME SPAN | COMPARISON RANGE | ACCURACY | MASTER | SLAVE |
| --- | --- | --- | --- | --- | --- |
| Lock | 1/30 sec. | 1 video frame | ±1/60 | 1-10 | −10-+20 |
| Capture 1 | 1/15 sec. | 2 video frames | ±1/30 | 1-20 | −20-+40 |
| Capture 2 | 1/7 sec. | 4 video frames | ±1/15 | 1-40 | −40-+80 |
| Capture 3 | ¼ sec. | 8 video frames | ±1/7 | 1-80 | −80-+160 |
| Capture 4 | ½ sec. | 16 video frames | ±¼ | 1-160 | −160-+320 |
| Capture 5 | 1.0 sec. | 32 video frames | ±½ | 1-320 | −320-+640 |

If synchronization still cannot be made, the system then alerts an operator, and transfers speed control of the slave machine to manual control, continuing to expand its comparison buffer if necesary. The operator manually varies the rate of the SMPTE or other speed control code being sent out of the device, while listening to the master and slave inputs, usually as separate headphone channels from the monitor output mixer 40. When the incoming slave signal is discovered by the invention to be in an acceptable range of synchronization once again, the system takes back automatic speed control of the slave device.

The output of the cross correlation procesor board 55 is a series of digital words representing changes in speed it judges to be necessary to make the slave sound match the master sound. This variance signal 56 is coupled to the external host computer 77.

The computer 77 has three functions in the preferred embodiment of the present invention, speed control 60, analysis control 61 and data display 62. The computer 77 may be any suitable personal computer or any other computing means capable of performing such functions. In the preferred embodiment of the present invention, an AMIGA computer manufactured by Commodore is utilized.

The variance signal 56 is coupled to the speed control 60 of computer 77. Speed control 60 evaluates the out- The output of variable SMPTE generator 33 is coupled to another generator which can generate other types of speed control signals such as tachometer pulses or MIDI (Musical Instrument Digital Interface) signals. Output port control 32 selects which signals are needed for speed control of the slave, and routes them to the appropriate output plugs. The usual output in the present invention is a signal coupled to a standard transport control synchronizer 66. This standard SMPTE-driven synchronization controls the slave's motor transport mechanism. The synchronizer 66 locks on to the incoming stream of SMPTE bits, and controls the speed of the slave machine based on the bit rate. In that manner, it will follow the bit rate input no matter what frame rate results.

Referring again to computer 77, analysis control 61 tracks the synchronization of the three types of analysis of the present invention. As previously discussed, when one method of analysis is in disagreement with the other two, the sample windows of that method are expanded by analysis control 61 so that the method may be brought into alignment with the rest of the system.

Data display 62 is used to provide a color graphic display representation of the spectral frame information for editing and analysis purposes, as well as a display of the relative synchronization of the master and slave tracks.

Supervisor processor 51 also outputs signals 64 to machine readout 72, which output control signals 36 and 37 to the display panels on the front of the invention to show its status, the amount of speed change being made, the frame numbers used, and other information.

Although the present invention utilizes three methods of analysis to provide a redundancy check and cross check for improved synchronization, it will be understood that any of the three methods may be utilized in the present invention without departing from the scope of the present invention. For example, synchronization could be achieved using only one of the three discrete methods of analysis or any combination of two of the methods of analysis as well. The basic advantage of the present invention is that the output is not sound but a control signal controlling the speed of a signal source. Therefore, the sound or other signal being analyzed can be radically simplified to optimize the comparison and speed capabilities of the present invention.

For certain applications, one method of analysis may be better suited than the other. For example, in spoken word dialogue, the frequency of the actor's voice is not as important as the start and stop points of his speech. This is particularly true when synchronizing replacement dialogue to a prerecorded video. In that instance, amplitude envelope information may be best suited for the analysis.

The computer 77 also includes cueing information so that comparison can begin on the correct frame. As previously noted, SMPTE reader 14 provides this information as output 16 which is coupled to cross correlation processor board 55. However, it is to be emphasized that the SMPTE or other sync pulse information is utilized only to provide start and stop points for comparison, and that the SMPTE signals of different sounds are not used for comparison, rather the sound information itself is utilized. In addition to utlizing SMPTE code information, MIDI (Musical Instrument Digital Interface) information may be utilized for cueing the analysis. MIDI information is a standard code that has a clock pulse in several tracks and is used to tell musical instruments, for example a synthesizer, when to perform certain operations.

Other types of cueing information may be provided to the computer 77. For example, when a prerecorded video or film is being synchronized to a live performance, an operator may be aware that the performer will interject pauses in a performance at certain periods or speed up or slow down certain passages. This information can be provided to the computer 77 so it can anticipate those areas and react accordingly. If the master and/or slave signal is stored first, the computer can use it to "look ahead" to anticipate changes before they occur.

In addition, in many studio tape systems, more than one head is utilized. For example, there may be a separate playback head and record head, with the record head capable of playback. In those situations, the signal from one head may be coupled to the computer 77 so that the computer has a "preview" of the signal a fixed time ahead of when the "real" sound gets to the processor 55. In that manner, changes in the sound can be anticipated prior to analysis.

APPLICATIONS

Pictures to Live Performances

Figure 2:
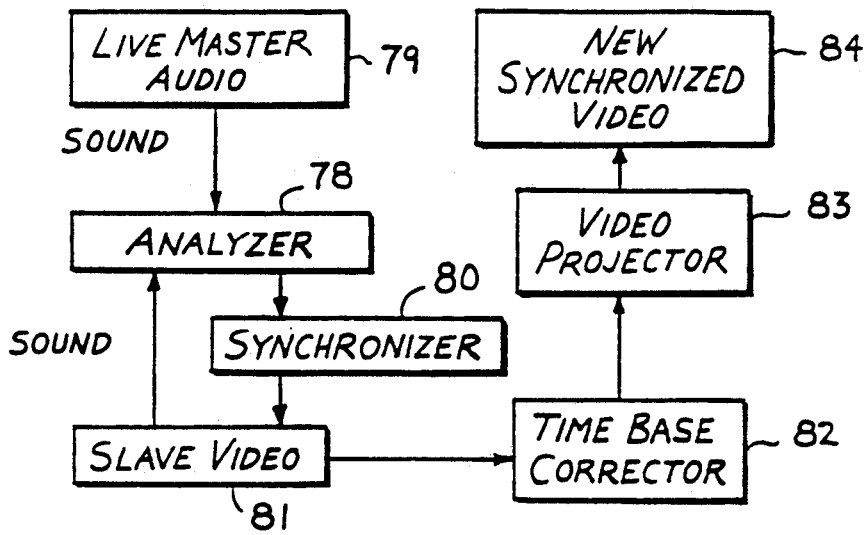
FIG. 2 is a block diagram illustrating the use of the present invention in synchronizing a prerecorded video signal to a live audio source.

The present invention may be utilized advantageously to synchronize a prerecorded video or film to a live performance of the soundtrack of that video or film. This has particular application in the music field where a performer may perform a song live and a screen showing a video or film of the song may be synchronized with the live performance. An example for apparatus to achieve this is illustrated in FIG. 2.

Live master audio 79 represents the live performance of a song. For this example, a projected video will be described. Slave video 81 represents a prerecorded film or video of the same song. The sounds from both these sources are inputted to analyzer 78, which represents the present invention. The analyzer 78 performs the three methods of analysis on the input live audio and the audio soundtrack from the prerecorded film or video. The results of this analysis are coupled to synchronizer 80 which outputs a speed control signal coupled to the slave video 81 to control the speed of the video so that it may match the live performance. To stabilize this variable video picture, so it remains intelligible, the video signal is run through a time base corrector 82 prior to the output to video projector 83. The video projector 83 outputs this corrected video picture resulting in a new synchronized video picture 84 matching the live master audio 79. This synchronization process may also be used with a film projector, where the speed control signal to a motion control motor varies the speed of the shutter and transport mechanism, and no extra picture stabilization equipment is needed.

Automatic Dialogue Replacement (ADR)

Figure 3:
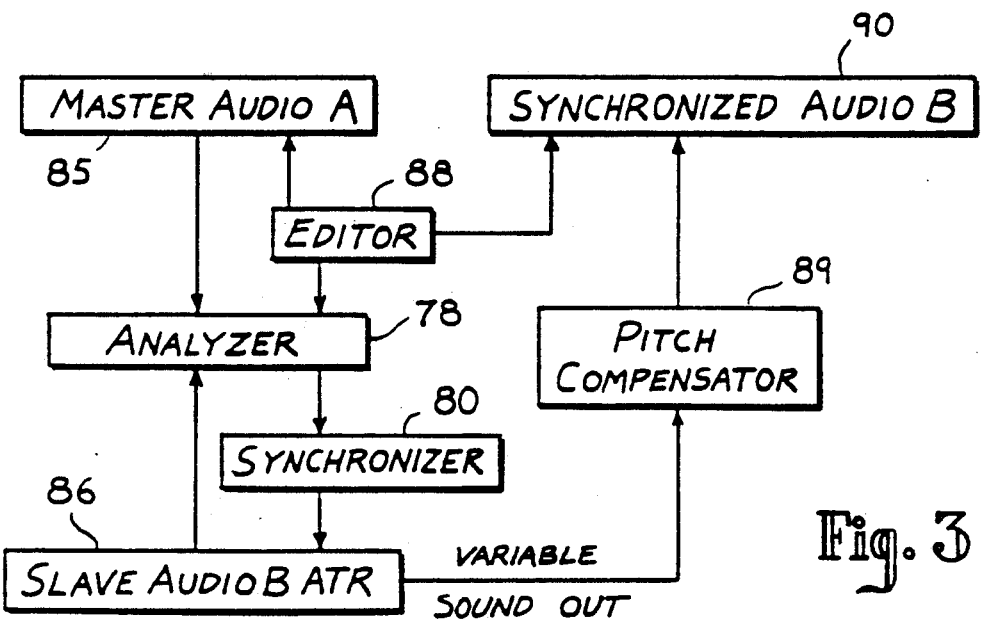
FIG. 3 is a block diagram illustrating the present invention as applied to the synchronization of two audio signals.

The present invention can save substantial time needed for the process of automatic dialogue replacement in films and television. Such a system is illustrated in FIG. 3. Master audio A 85 represents the original soundtrack of the film or video which is to be replaced. This signal is outputted to analyzer 78.

The replacement dialogue is represented by slave audio B audio tape recorder (ATR) 86 whose output is also inputted to analyzer 78. An editor 88 controls the master audio A 85, and the slave audio 86 through the analyzer 78 and synchronizer 80, so that signal processing can begin at the same point in time.

As previously discussed, the analyzer 78 compares the signatures of the incoming signals and produces an error signal used to generate a speed control signal. The speed control signal is coupled through synchronizer 80 to slave audio B 86. A corrected output of slave audio B 86 is coupled through a pitch compensator 89. The purpose of this external pitch compensator is to compensate for any variations in pitch or distortions caused by the speeding up or slowing down of the slave audio source 86. For example, as the slave audio B 86 signal is increased in speed, the frequency is compressed resulting in a higher pitch than would normally be produced. The output of pitch compensator 89 is coupled to rerecord machine 90, which records the synchronized replacement dialogue as the new soundtrack for the original prerecorded film or video. Of course, this synchronized sound replacement would also work for music recording and other sound replacement.

Variable Telecine Soundtrack Replacement

Figure 4:
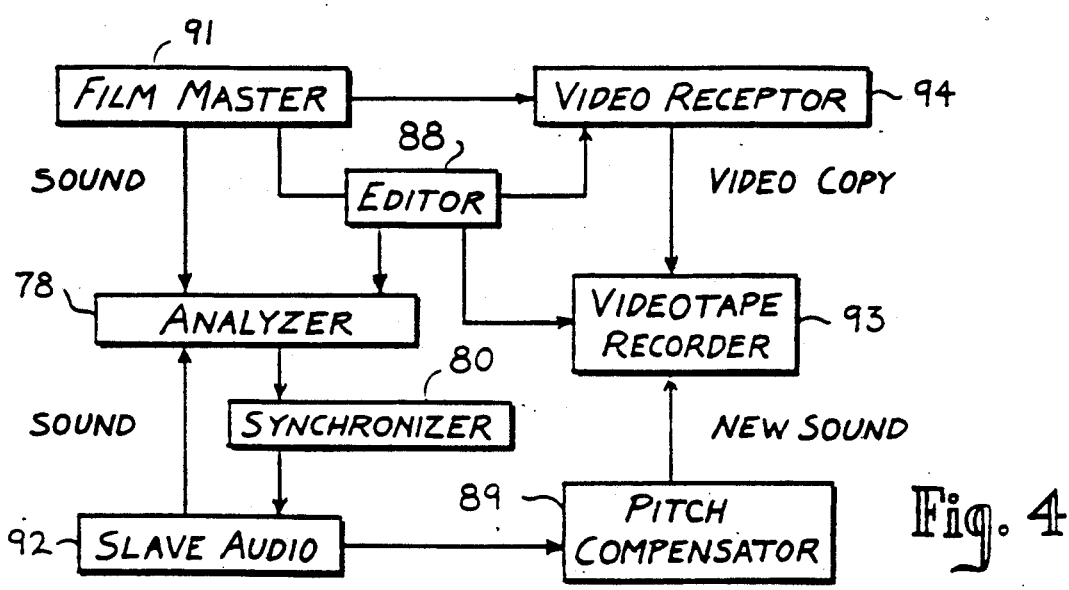
FIG. 4 is a block diagram illustrating the present invention as applied to soundtrack replacement of a film or video.

Variable telecine soundtrack replacement enables corrections of the picture or soundtrack to be made during film to tape transfer processes, or when making video copies. Such a system is illustrated in FIG. 4. When replacing a soundtrack, the soundtrack of the original film or video 91 is used as the master. The slave audio 92 is a soundtrack to be added to the new copy of the video or the video copy of the film. The master 91 and slave 92 are inputted to the analyzer 78, broken down into signature signals, and a speed control signal is outputted by synchronizer 80 to slave audio 92. The corrected audio signal is outputted from slave audio 92 to pitch compensator 89 to correct any distortions in sound, and the corrected output of the pitch compensator 89 is coupled to video tape recorder 93. The picture portion of the film 91 is coupled to video receptor 94 whose output is inputted to video tape recorder 93 so that the new tape copy has both picture and sound in perfect synchronization. An editor 88 controls the start and stop of film master 91, slave 92, video receptor 94 and video tape recorder 93.

Variable Telecine for Varying Picture

Figure 5:
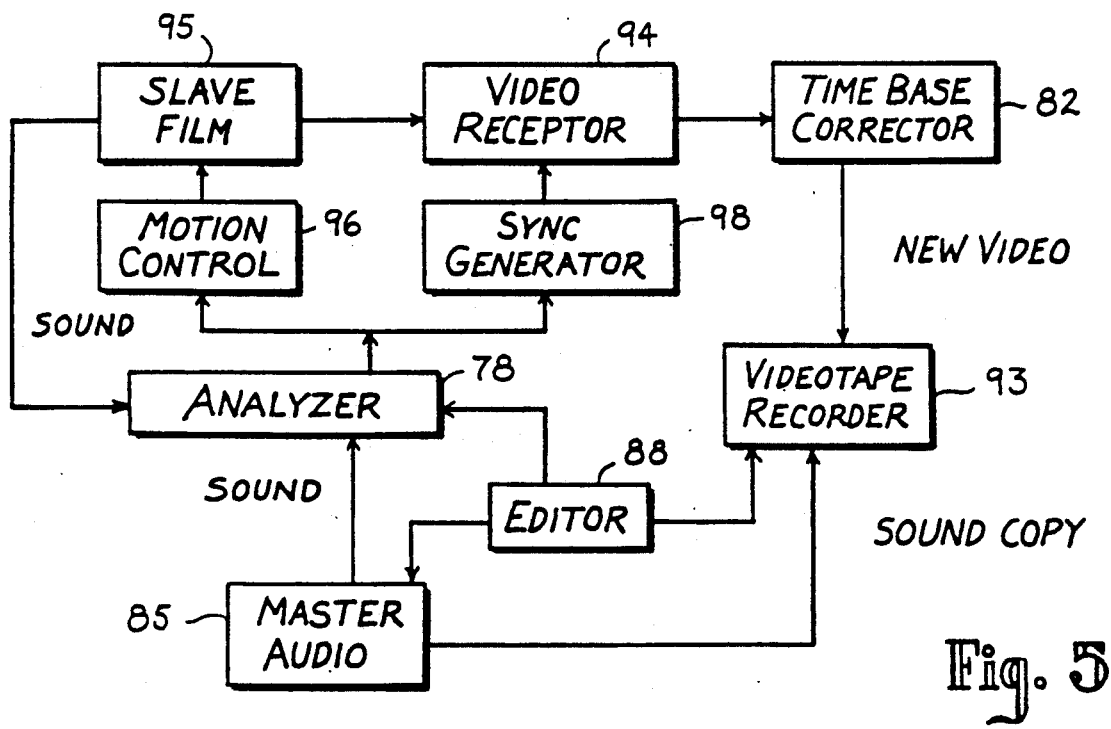
FIG. 5 is a block diagram illustrating the present invention as used in synchronizing a video signal to an existing soundtrack.

In correcting the speed of the picture to better match the new soundtrack, problems arise in synchronizing a video camera picking up a variable speed film image so that the film and video frame rates are matched. The present invention is particulary useful for such a process. One example of such a system is shown in FIG. 5. The external soundtrack is used as a master and the film soundtrack 95 is slave to it. These signals are each inputted to analyzer 78 and matched speed control signals are outputted to motion control 96 and sync generator 98. The sync generator 98 controls the video receptor 94 picking up the image from the slave film 95, while the motion control 96 controls the motion of the slave film 95, so that the frame rates of the film and video may be matched. The output of the video receptor 94 is coupled through a time base corrector 82 to video tape recorder 93. Thus the variable speed video image is stabilized before it is recorded on the master video tape recorder in alignment with the new soundtrack. An editor 88 controls start and stop points of the various devices.

Dual Sound and Picture Control

Figure 6:
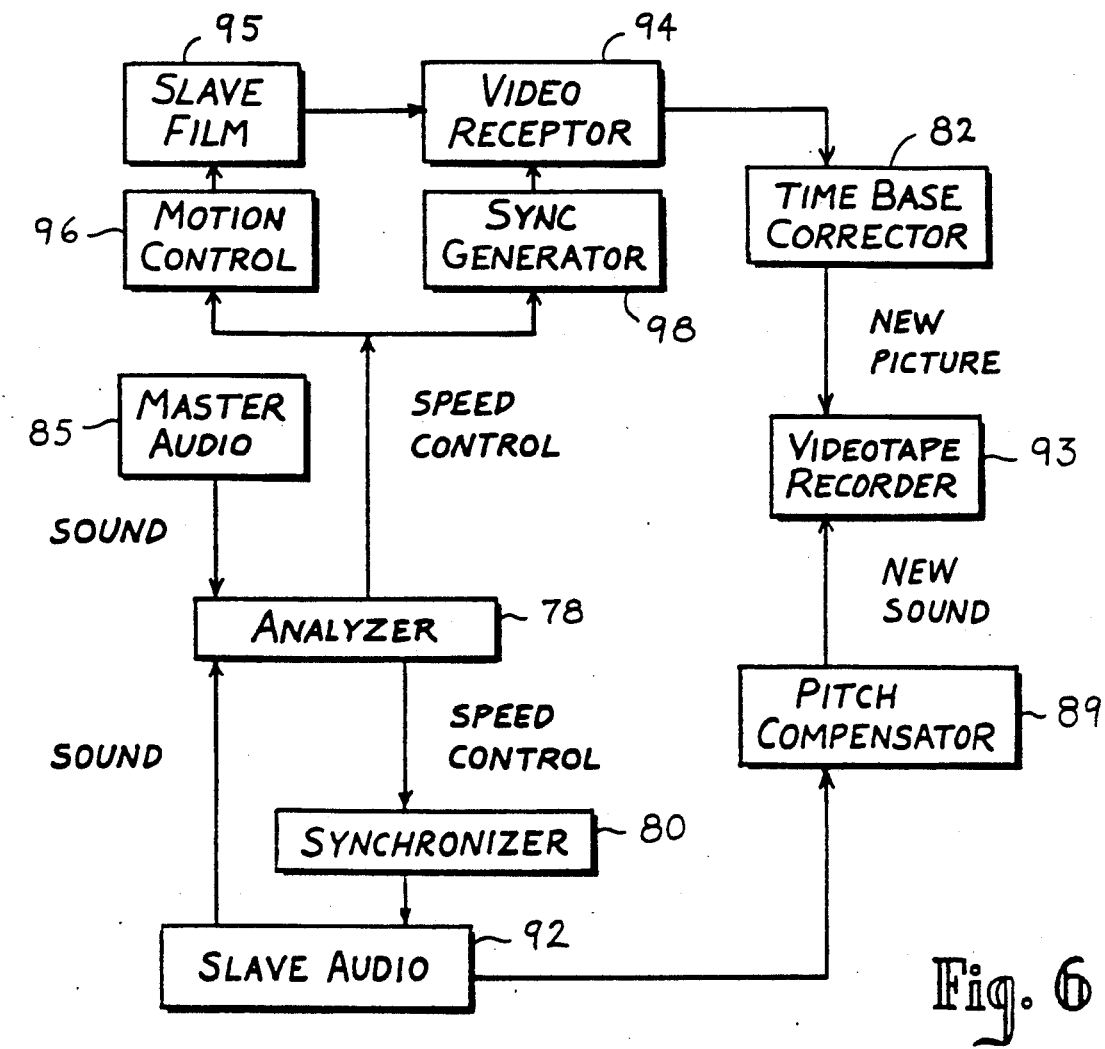
FIG. 6 is a block diagram illustrating the present invention as used for dual sound and picture control.

The present invention may also be utilized for creating the large changes of timing needed for dubbing programs of prerecorded film or video into another language. One such system is illustrated in FIG. 6.

In such a system, both sound and picture are being synchronized. The original dialogue of the film, in the preferred embodiment on a separate soundtrack, is used as master audio 85. The new language soundtrack 92 is slave to the master audio 85. Both are coupled to analyzer 78. To achieve the best fit, either the new language slave audio track 92 or the slave film 95 can be varied to create a better match with the overall envelope patterns of the master soundtrack. The corrected audio outputted by slave audio 92 is coupled through pitch compensator 89 to a video tape recorder 93 to be added to the picture of the dubbed film. If the picture is to be varied, speed control signals are outputted by analyzer 78 to motion control 96 and sync generator 98 so that video receptor 94 may be matched to slave film image 95. This variable speed video image outputted from video receptor 94 is coupled through a time base corrector 82 to video tape recorder 93 resulting in a new synchronized video or sound track.

What is claimed is:

1. An apparatus for continuously correlating a stored master and a live slave sound in order to generate a variable synchronizing signal, said apparatus including:
a slave source means outputting a first sound signal and an associated sequence of images in synchronization with said first sound signal, said slave source means regulated according to a transport control driven by a synchronization pulse at a first rate;
a master source means outputting a second sound signal, said second sound signal being independently generated and having measurably similar characteristics to said first sound signal;
signature extraction means coupled to said second sound signal for extracting signature information from said second sound signal, said signature information comprising at least three types of measurements of said second sound signal sufficient to identify said measurably similar characteristics;
storage means coupled to said signature extraction means for storing signature information from said master source means;
said signature extraction means coupled to said first sound signal for extracting signature information from said first sound signal, said signature information comprising at least three types of measurements of said first signal sufficient to identify said measurably similar characteristics;
comparing means coupled to said storage means and said signature extraction means, said comparing means providing an amount of temporal offset between said signature information from said first and second sound signals;
processing means coupled to said comparing means for evaluating said amount of temporal offset;
generating means coupled to said processing means, said generating means providing said synchronization pulse at a second rate, equal to said first rate modified by the amount of temporal offset provided by said processing means, said synchronization pulse being sufficient to drive said transport control to vary the rate of output of said slave source means, thereby causing a change of speed of said slave source means wherein said slave source means and said master source means are brought into synchronization;
image correction means connected to said slave source means for presenting said sequence of images in an intelligible manner according to said change in speed of said slave source means;
compensating means coupled to said signature extraction means for adjusting said signature extraction means to correct for frequency distortion in said first sound signal resulting from said change in speed of said slave source means.

2. The apparatus of claim 1 wherein said slave source means comprises an Audio Tape Recorder (ATR), which does not output said sequence of images in synchronization with said first audio signal.

3. The apparatus of claim 1 wherein further including external pitch compensation means coupled to said slave source to correct the distortion in pitch in said first sound caused by said change of speed of said slave source means.

4. The apparatus of claim 1 wherein said synchronization pulse is Society of Motion Picture and Television Engineers (SMPTE) time code.

5. The apparatus of claim 1 wherein said synchronization pulse is a tachometer pulse.

6. The apparatus of claim 1 wherein said synchronization pulse is a Musical Instrument Digital Interface (MIDI) clock.

7. The apparatus of claim 1 wherein said said slave source comprises a video player and said image correction means comprises a video time base corrector.

8. The apparatus of claim 1 wherein said slave source comprises a film projector with a motor capable of being varied in speed, and wherein said image correction means comprises a shutter and film transport mechanism coupled to said motor.

9. The apparatus of claim 1 wherein manual control backup means are provided to allow manual variation of the rate of said generating means in the event said comparing means fail to provide a result within limits determined by said processing means.

10. The apparatus of claim 1 wherein said types of measurements comprising said signature information consist of frequency measurements.

11. The apparatus of claim 10 wherein said signature extraction means consists of a bank of at least three retunable bandpass filters whose frequencies are capable of being changed by said compensating means.

12. The apparatus of claim 10 wherein said signature extraction means includes digitizing means for converting said first and second sound signals to digital words, said digitizing means having a digitizing rate capable of being adjusted according to said compensating means, and spectrum analysis means coupled to said digitizing means for determining the output of said first and second signals at selected frequencies by performing a Fast Fourier Transform analysis.

13. The apparatus of claim 1 wherein said types of measurements comprising said signature information consist of an analog measurement, a digital measurement and an envelope measurement, with said analog measurement comprising a bank of retunable bandpass filters whose frequencies are capable of being changed by said compensating means, and said digital measurement comprising digitizing means for converting said first and second sound signals to digital words, said digitizing means having a digitizing rate capable of being adjusted according to said compensating means, and spectrum analysis means coupled to said digitizing means for determining the output of said first and second sound signals at selected frequencies by performing a Fast Fourier Transform analysis.

14. An apparatus for continuously correlating a stored slave and a live master sound in order to generate a variable synchronizing signal, said apparatus including:
a slave source means outputting a first sound signal and an associated sequence of images in synchronization with said first sound signal, said slave source means regulated according to a transport control driven by a synchronization pulse at a first rate,
a master source means outputting a second sound signal, said second sound signal having measurably similar characteristics to said first sound signal;
signature extraction means coupled to said first sound signal for extracting signature information from said first sound signal, said signature information comprising at least three types of measurements of said first sound signal sufficient to identify said measurably similar characteristics;
storage means coupled to said signature extraction means for storing signature information from said slave source means;
said signature extraction means coupled to said second sound signal for extracting signature information from said second sound signal, said signature information comprising at least three types of measurements of said first sound signal sufficient to identify said measurably similar characteristics;
comparing means coupled to said storage means and said signature extraction means, said comparing means providing an amount of temporal offset between said signature information from said first and second sound signals;
processing means coupled to said comparing means for evaluating said amount of temporal offset;
generating means coupled to said processing means, said generating means providing said synchronization pulse at a second rate, equal to said first rate modified by the amount of temporal offset provided by said processing means, said synchronization pulse being sufficient to drive said transport control to vary the rate of output of said slave source, thereby causing a change of speed of said slave source means wherein said slave source means and said master source means are brought into synchronization;
image correction means connected to said slave source means for presenting said sequence of images in an intelligible manner according to said change in speed of said slave source means;
compensating means coupled to said storage means for adjusting the location of the signature information representing the next moment of said first sound signal from said slave source means, according to said change of speed of said slave source means.

15. The apparatus of claim 14 wherein said slave source means comprises an Audio Tape Recorder (ATR), which does not output said sequence of images in synchronization with said first audio signal.

16. The apparatus of claim 14 further including external pitch compensation means coupled to said slave source to correct the distortion in pitch in said first sound caused by said change of speed of said slave source means.

17. The apparatus of claim 16 wherein said types of measurements comprising said signature information consist of frequency measurements.

18. The apparatus of claim 17 wherein said signature extraction means consists of a bank of at least three retunable bandpass filters whose frequencies are capable of being changed by said compensating means.

19. The apparatus of claim 17 wherein said signature information means includes digitizing means for converting said first and second sound signals to digital words, said digitizing means having a digitizing rate capable of being adjusted according to said compensating means, and spectrum analysis means coupled to said digitizing means for determining the output of said first and second sound signals at selected frequencies by performing a Fast Fourier Transform analysis.

20. The apparatus of claim 14 wherein said synchronization pulse is Society of Motion Picture and Television Engineers (SMPTE) time code.

21. The apparatus of claim 14 wherein said synchronization pulse is a tachometer pulse.

22. The apparatus of claim 21 wherein said slave source comprises a film projector with a motor capable of being varied in speed according to said tachometer pulse, and wherein said image correction comprises a shutter and film transport mechanism coupled to said motor.

23. The apparatus of claim 14 wherein said synchronization pulse is a Musical Instrument Digital Interface (MIDI) clock.

24. The apparatus of claim 14 wherein said slave source comprises a video player and said image correction means comprises a video time base corrector.

25. The apparatus of claim 14 wherein manual control backup means are provided to allow manual variation of the rate of said generating means in the event said comparing means fail to provide a result within limits determined by said processing means.

26. The apparatus of claim 14 wherein said types of measurements comprising said signature information consist of an analog measurement, a digital measurement and an envelope measurement, with said analog measurement comprising a bank of bandpass filters, and said digital measurement comprising digitizing means for converting said first and second sound signals to digital words, and spectrum analysis means coupled to said digitizing means for determining the output of said first and second sound signals at selected frequencies by performing a Fast Fourier Transform analysis.

* * * * *